United States Patent

[11] 3,616,908

| [72] | Inventors | Karl Rokitansky;<br>Guenther Solt, both of Vienna, Austria |
|---|---|---|
| [21] | Appl. No. | 865,016 |
| [22] | Filed | Oct. 9, 1969 |
| [45] | Patented | Nov. 2, 1971 |
| [73] | Assignee | Vogelbusch Gesellschaft mbH<br>Vienna, Austria |
| [32] | Priority | Oct. 16, 1968 |
| [33] | | Austria |
| [31] | | A 10,119/68 |

[54] ROTARY FILTERING DEVICE AND PROCESS OF OPERATING SAME
16 Claims, 4 Drawing Figs.

[52] U.S. Cl. ............................................. 210/67,
210/75, 210/386, 210/396
[51] Int. Cl. ............................................. B01d 25/38
[50] Field of Search ........................................ 210/75,
193, 386, 396, 67, 68

[56] References Cited
UNITED STATES PATENTS
| 2,102,780 | 12/1937 | Bielfeldt ..................... | 210/75 |
| 2,576,288 | 11/1951 | Fink et al. .................. | 210/75 |

*Primary Examiner*—Samih N. Zaharna
*Attorneys*—Erich M. Radde, Charles A. McClure, Gerard J. Weiser and Alfred Stapler ABSTRACT: A rotary drum filter having a filter aid layer on its filter surface is provided with an adjustable scraper at the line of discharge of the filter cake and with an adjustable stripper adjacent the line of wet filter cake formation as the filter cake emerges from the slurry tank. The scraper is automatically advanced toward the drum to progressively remove the filter cake with portions of the filter aid layer as the drum rotates and the stripper also is either manually or automatically advanced toward the drum to maintain a substantially constant thickness of filter cake on the layer of filter aid as the thickness of that layer progressively decreases.

PATENTED NOV 2 1971

INVENTORS
KARL ROKITANSKY and GUENTHER SOLT
BY
Erich M. H. Radde
AGENT

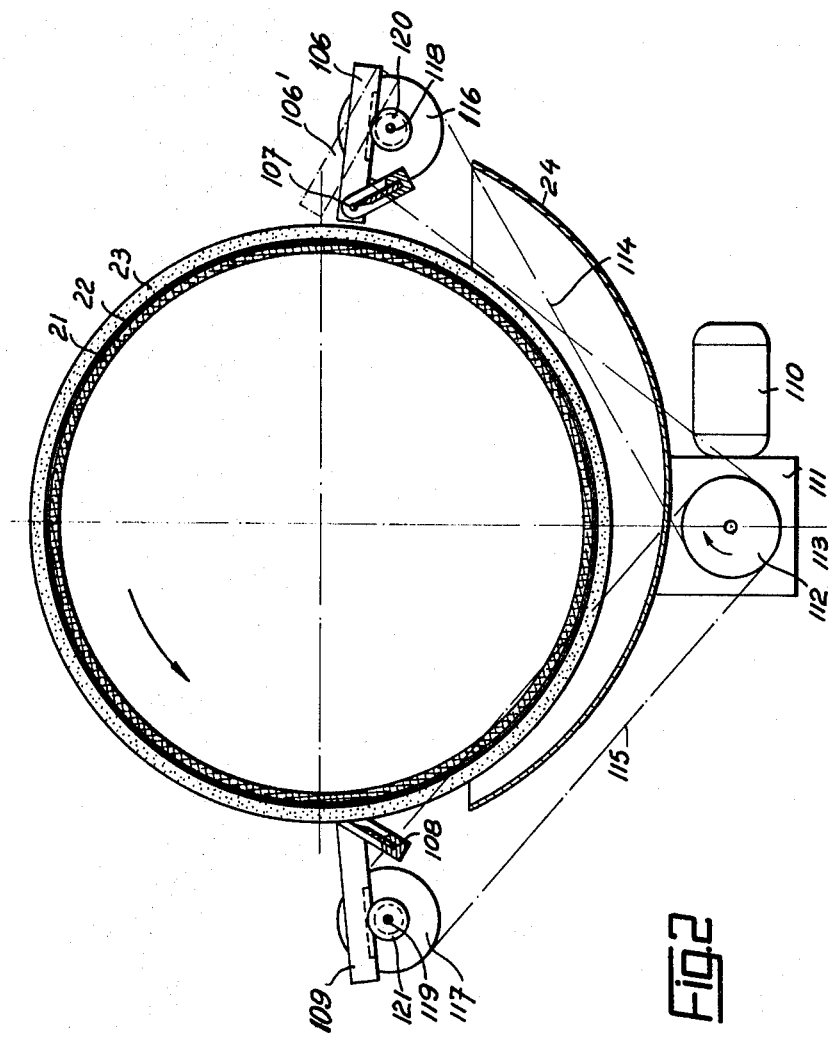

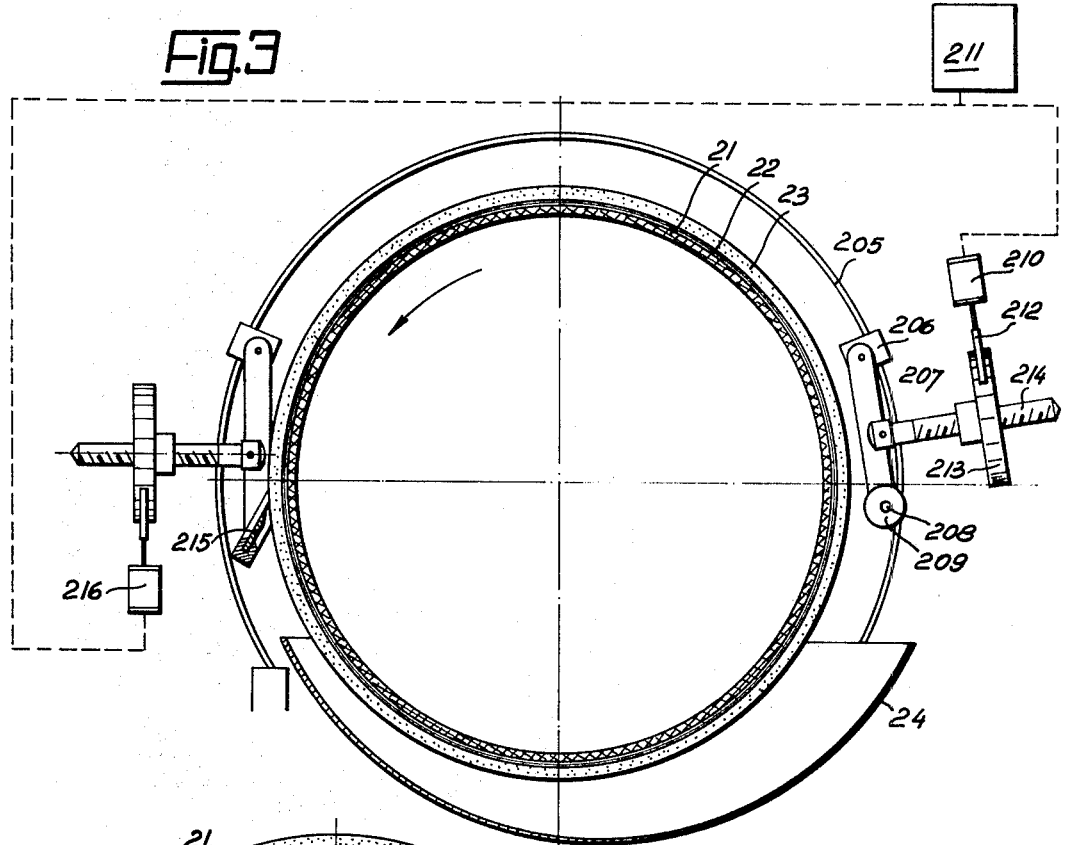
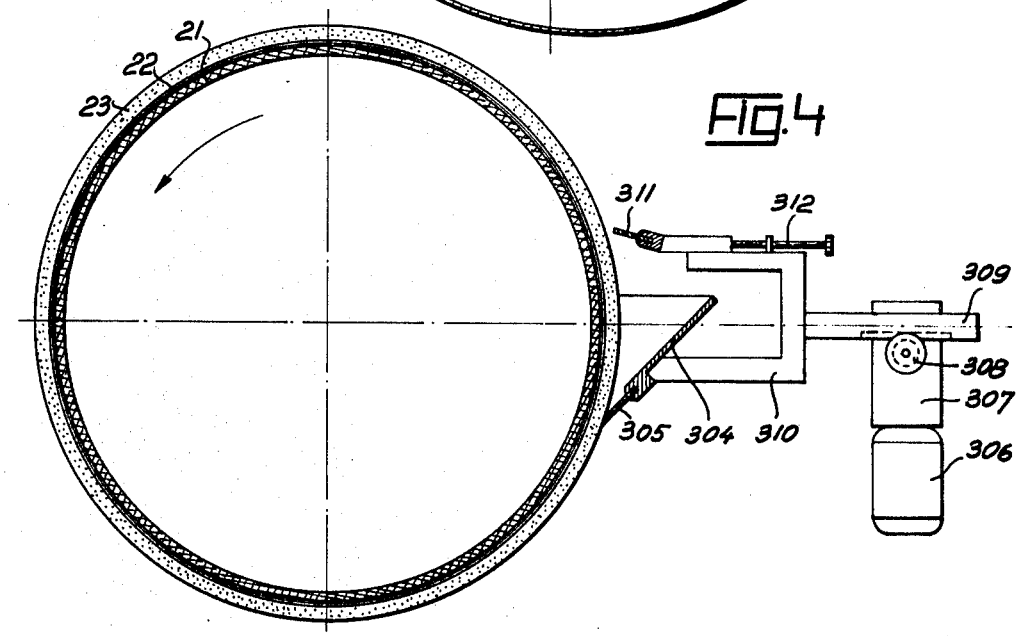

ROTARY FILTERING DEVICE AND PROCESS OF OPERATING SAME

BACKGROUND OF THE INVENTION

1. Field of the Invention

The present invention relates to an improved rotary filtering device and more particularly to a rotary filtering device provided with a layer of a filtering aid, and to a process of filtering goods by means of such a rotary filtering device.

2. Description of the Prior Art

When filtering suspensions which cause gradual clogging of the filter cloth, for instance, when filtering yeast suspensions, usually so-called peeling off suction filtering devices are used. Before operating such a type of rotary filters, a layer of a filter aid is applied to the suction surface of the filter. Said filter aid layer is gradually removed during filtration by the scraper which separates the filtered material from the filter, whereby the scraper is advanced toward the suction surface. As a result of such an advancement of the scraper again and again a fresh, nonclogged surface of the filter aid is made available for filtration. Due thereto the filtering life of the rotary filter is considerably prolonged and a substantial increase in the output of the filter is achieved.

However, rotation of the rotary filter on immersion of its lower portion into the suspension to be filtered which is introduced into the tank or vat of the filter causes the suspension to be deposited on the filter in a thickness greater than that which can actually be filtered during the time available for filtration until the filtered material is removed from the filter. The period of time available for effecting filtration to substantially the dry state is further decreased under otherwise like conditions of operation of the rotary filter if, for instance, the filter cake is washed on the rotary filter. In such a case only a relatively small part of the entire filtering area of the filter is made available for dry filtration of the material to be filtered. All these reasons are responsible for the fact that satisfactory operation of a rotary filter is dependent on proper adjustment of the thickness of the layer of the material to be filtered to the desired value.

Heretofore this has been achieved, as is well known, by providing a stripping device between the immersion zone and the removal zone of the rotary filter, said stripper being arranged parallel to the axis of the filter. The stripper removes excess suspension which initially has been taken up by the filter and returns said excess suspension, for instance, into the tank or vat.

The thickness of the layer of filter aid which, for instance, amounts to 20 mm. at the beginning of the filtration, is gradually reduced by the scraper to almost zero during filtration, for instance, within several hours. Therefore, the stripper must automatically follow the receding surface of the filter aid layer in order to maintain a uniform and substantially constant thickness of the filter cake.

Heretofore, this has been achieved by pressing the stripper by spring or weight action against the wet layer of the material to be filtered as deposited on the filtering surface.

However, when filtering difficulty separable suspensions, for instance, of beer yeast in the form of a heavy paste, of bottoms, cast deposits or sediments, of torula yeast cream, or suspensions which contain elongated, myceliumlike cell structures, this method has the disadvantage that, due to the pressure of the stripper resting upon the filter cake, it partly solidifies the excess slurry that is to be removed from the set layer of the material to be filtered.

The stripped, partly solidified filter cake is dispersed only with difficulty in the suspension supplied to the tank or vat. Even if the tank or vat is very large, the suspension soon thickens, thus seriously hindering filtration. If gumlike, readily moldable or spreadable particles such as protein containing sediments or suspensions, tree resins or hop resins, nodules and agglomerations of Myxobacteriaceae, and others are present in the liquid phase of the suspension to be filtered, said particles are spread in a highly disadvantageous manner over the layer of the filtered materials and are pressed thereinto by the pressure exerted by the stripper. Increased consumption of filter aid and decreased output are the result thereof. The above described particles resting on the surface of the filter aid layer actually combine to form an almost continuous and coherent covering layer.

SUMMARY OF THE INVENTION

It is one object of the present invention to provide a simple and highly effective filtering process for filtering suspensions on rotary filters which is free of the disadvantages of the known filtering process.

Another object of the present invention is to provide an improved rotary filtering device for carrying out said filtering process.

Other objects of the present invention and advantageous features thereof will become apparent as the description proceeds.

In principle, the process according to the present invention comprises the features of reducing the thickness of the filter aid layer of the material to be filtered by means of a stripping device provided between the immersion zone and the removal zone of the rotary filter at a selectively adjustable distance from the receding surface of the filter aid layer. Said stripper follows the surface of the filter aid layer in accordance with the decreasing thickness of said layer during filtration as caused by the advancement of the scraper. Thereby, the scraper is held in selectively adjustable position at least during part of the operating time of the rotary filter and is caused to follow the receding surface of the filter aid layer in accordance with the thickness of said layer.

The process according to the present invention is especially useful in the operation of a rotary filter if difficulty filterable or separable suspensions are to be filtered. The term "difficulty filterable or separable" indicates that the liquid phase of the suspension consists, among others, of a. a liquid having the tendency to foam;
b. a liquid containing considerable amounts of gases;
c. a liquid charged with gas bubbles;
d. a liquid containing bacterial infectious material;
e. a liquid containing sugars, pectins, or similar compounds and tending to stick, or of combinations of such liquids. The solid phase of such suspensions may also be contaminated by f. agglomerations and nodules of slime bacteria or Myxobacteriaceae;
g. small globules of tree resins or hop resins;
h. protein containing sediments, and others and may react with solidification if exposed to mechanical stress.

According to the present invention contact of the stripper with the already partly solidified layer formed in the immersion zone can be avoided. Its distance from the surface of the filter aid layer can be adjusted and maintained or, respectively, increased so that the permeability of the freshly formed layer of the filtered material is not mechanically affected in a negative sense.

In addition thereto provision of a stripper of the type suggested according to the present invention results in an increase in output which is caused by the stripper leaving also untouched that portion of the suspension which adheres to the layer of material formed in the immersion zone and to be filtered and dried, by permitting said portion to be moved, by the rotation of the rotary filter drum, into the drying zone between stripper and discharge device, and by thus assuring that a maximum of filtered material is dry filtered on each rotation of the rotary filter and is finally removed therefrom by the scraper. Drying by suction of the filtered material is furthermore improved by the stripper inasmuch as it quantitatively removes excess suspension without affecting the underlying layer which was not contacted by the scraper. Any detrimental effect upon the boundary zone between filter aid and the material to be filtered in its wet condition is thereby avoided. This is in contrast to spring- or weight-operated doctor blades. As a result thereof the scraper acts upon an unaffected boundary layer of a low moisture content which thus favors removal of the filter cake. In contrast to peeling filtering devices of known construction the filtering device according to the present invention has the advantage that it permits operation at a considerable decreased speed of advancement of the discharge device and thus of the scraper itself.

The stripping devices as used heretofore which were able to strip part of the partly solidified layer of filtered material, had an unfavorable effect on the safety in operating such rotary filters. The pasty and voluminous filtered material filtered material causes smearing of the exposed parts of the stripper device, forms increasingly more voluminous lumps, changes the forces given by the action of weights or by spring pressure, and disadvantageously affects stripping of suspension form the filter.

According to the present invention satisfactory functioning of the rotary filter is highly dependent on the proper and exact adjustment of the stripper device. The process according to the present invention renders it possible to maintain a predetermined optimum adjustment of the stripper with respect to its distance from the surface of the filter or, respectively, the filter aid layer during the entire operation of the filter.

The speed at which the surface of the filter aid layer is diminished and recedes, is predetermined by the speed with which the scraper for separating the filtered material from the filter aid layer advances. Consequently the speed with which the stripper follows said recession of the filter aid layer must be adjusted with respect to the speed with which the scraper for removing the filtered material advances.

To achieve this goal, the stripper, for instance, may be caused, at least during part of the working time of the rotary filter, to positively follow the receding surface of the filter aid layer in accordance with the advancement of the scraper for removing the filtered material. The positive cooperation of stripper and scraper is achieved by providing a driving means for the stripper which is coacting with the driving means causing advancement of the scraper for removing the filtered material.

According to another embodiment of the present invention the driving means for the stripper and the driving means for the advancement of the scraper are caused to operate synchronously. In this case both driving means are preferably constructed in a similar manner.

According to a further embodiment of the present invention it is also possible, for instance, to actuate the advancement of the scraper for removing the filtered material as well as the follow up advancement of the stripper by a common driving means. This is of advantage in all cases where scraper and stripper are located near each other. In this case the stripper as well as the scraper may be arranged, for instance, on a common support.

Follow up advancement of the stripper may take place uniformly, for instance, by means of a drive by an electromotor with variable speed gearing. It may also be effected discontinuously, for instance, step by step, by step, if the drive is actuated by a ratchet or the like means which receives mechanical, pneumatic, hydraulic, or electric impulses in preselected time intervals and which causes advancement of the stripper to a small extent, for instance, by 0.05 mm. on receiving an impulse. The advantage of such an actuating arrangement is to be seen, for instance, in its large speed range which can rarely be attained by means of a conventional variable speed gearing.

The distance of the stripper from the surface of the filter aid layer is primarily determinative for limiting the thickness of the filtered material layer on the filter.

According to a preferred embodiment of the present invention the filtering device can be operated in such a manner that the distance of the stripper from the surface of the filter aid layer remains substantially the same during filtration. Good results are achieved when proceeding in this manner.

However, the resistance to filtration of the filter aid layer frequently decreases with decreasing layer thickness. As a result thereof the filter is able to cause drying of the filter cake at the end of the filtration procedure more rapidly than at its beginning. This permits formation of a greater thickness of the filtered material layer on the filter while the margin of output remains the same. Such an increase in yield of filtered material can be achieved by increasing the distance of the stripper from the surface of the filter aid layer during operation of the rotary filter and during resetting of the stripper distance. Such resetting of the distance of the stripper from the surface of the filter aid layer can be effected, for instance, at a lower speed than the speed at which the scraper is advanced. Alternatively the distance of the stripper may temporarily not be reset.

Thus the rotary filter for carrying out the process according to the present invention is characterized n principle by the feature that the stripper of the rotary filter can be locked in a selectively adjustable position parallel to the axis of the rotary filter and spaced from the surface of the rotary filter and that it can be adjusted continuously or discontinuously in the direction of the surface of the rotary filter, preferably as a function of the advancement of the scraper for the filtered material.

The stripper can be constructed flexibly. It preferably consists of a rubber or plastic strip or bar. Such a design is preferably selected if the suspension to be filtered contains coarser particles which must pass between stripper and filter aid layer without damaging the latter.

More exact operation, however, is achieved with a rigid stripper, preferably a metal blade.

With these two preferred embodiments of the invention the angle which the stripper forms with the surface of the filter aid layer is also of importance with respect to the position of the stripper. Therefore, this angle should also be adjustable.

Furthermore, the stripper can be constructed, for instance, in the form of a roll arranged parallel to the filter drum.

If the filter is used for various types of material to be filtered, it is sometimes advantageous to provide a stripper which is adjustable with respect to its position at the filter drum because in this manner the distance of the stripper from the immersion zone, on the one hand, and from the discharge zone, on the other hand, can be varied.

BRIEF DESCRIPTION OF THE DRAWINGS

The construction of the rotary filter drum according to the present invention and the manner in which it operates are illustrated in the attached drawings. In said drawings

FIG. 2 is a diagrammatic transverse vertical cross-sectional view of a rotary filter and showing the stripper and the scraper being driven by means of the same electromotor;

FIG. 3 is a diagrammatic transverse vertical cross-sectional view of a rotary filter and showing the coaction of stripper and scraper by pneumatic means; and FIG. 4 is a diagrammatic transverse vertical cross-sectional view of a rotary filter and showing a laterally arranged tank or vat for the material to be filtered.

Like index numerals in these FIGS. indicate like parts of the rotary filter.

DESCRIPTION OF THE PREFERRED EMBODIMENTS

Figure 1:
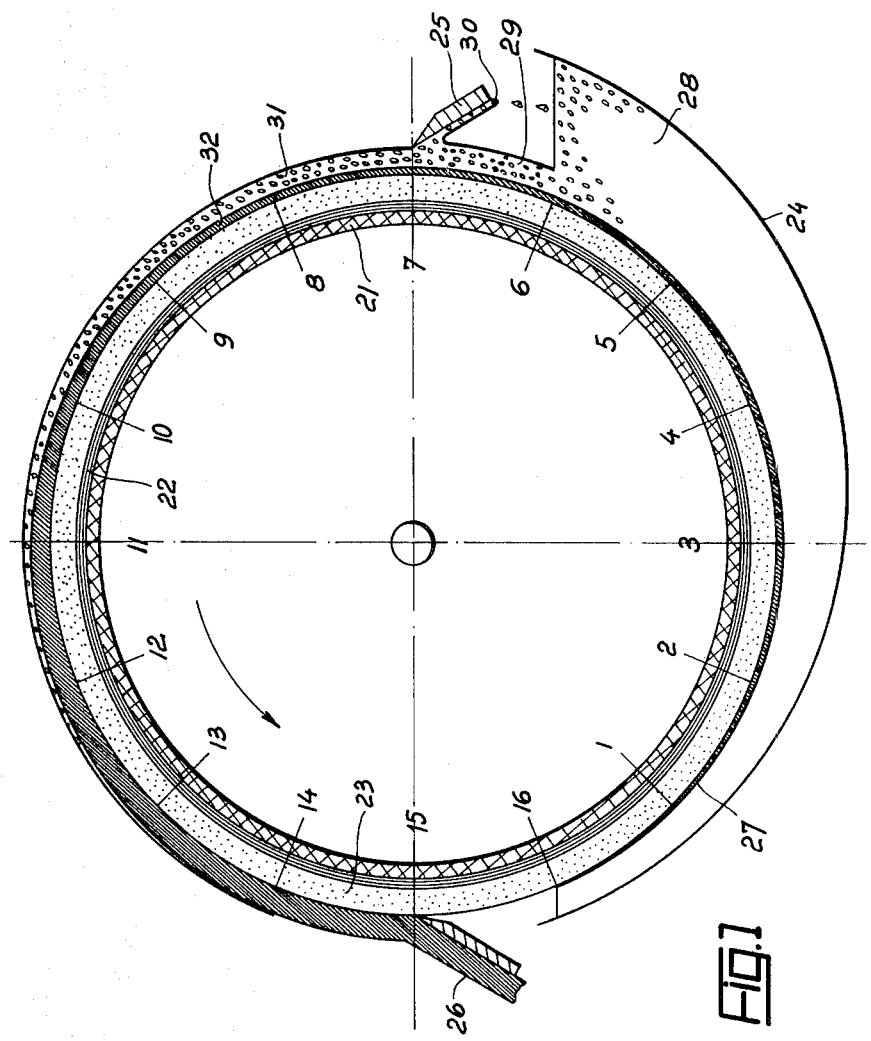
FIG. 1 is a diagrammatic transverse vertical cross-sectional view of a rotary suction filter.

The following examples serve to illustrate the present invention without, however, being limited thereto.

EXAMPLE 1

In FIG. 1 perforated filter drum 21 is covered by filter cloth 22 which is held under tension thereon. Filter aid layer 23 is formed on said filter cloth 22 and is retained thereon by the vacuum maintained in filter drum 21 and the outside atmospheric pressure. Filter drum 21 rotates around its axis in the direction indicated by the arrow. It immerses into the suspension 28 to be filtered which is kept in tank 24.

In order to more clearly explain the mode of action of stripper 25 the circumference of rotary drum 21 is subdivided into 16 sections. Each end point of said sections is designated by the numerals 1 to 16 in the direction of rotation of the drum. The suspension is a beer yeast cream from the fermenting room. The rate of rotation of filter drum 21 is selected so that one rotation of the drum takes place in 16 seconds. Thus the surface of the filter aid layer 23 passes through each of the 16 sections within one second.

On rotation of filter drum 21 from the point of immersion 16 to point 1 within the first second, a solid phase layer $s$ is formed from the suspension while a corresponding amount of liquid passes through the filter aid layer 23 into the interior of the filter drum 21. Up to point 4 there is formed a solid phase of the thickness $s \cdot \sqrt{4} = 20$ under the assumption that the resistance to filtration of the filter aid layer 23 compared to that of the layer of filtered material which forms thereon, is negligibly small.

The filter aid layer 23 emerges at point 6 from the yeast suspension 28. The solid phase layer 32 forming in the actual immersion zone between point 16 and 6 has then attained the thickness $s \cdot \sqrt{6}$. The viscosity of the yeast suspension 28 in tank 24 causes yeast suspension 29 to be taken along by adhesion from point 6 to point 7 even if the filter drum rotates with a low speed of rotation of 0.217 m./sec., the diameter of the filter drum being 1.1 m., $n = 3.75$ rotations per minute. Thereby deposition of yeast cells on the filter continues.

Due to the predetermined distance of stripper 25 from the surface of the filter aid layer 23, the stripper 25 permits a layer of suspension 31 to pass point 7 of the drum 21 without being disturbed. Thereby the thickness of said layer 31 is selected so that it can be designated as completely dewatered and dry approximately at point 14, i.e., a distance serving as a margin of safety before the scraper 26 removes the filter cake at point 15.

The properly selected distance of stripper 25 prevents excess suspension to be carried along on rotation of drum 21 by stripping it therefrom and returning it to the suspension 28 in tank 24 as shown in FIG. 1. At said point 7 excess suspension 30 has still approximately the same composition as the suspension 28 in tank 24 because it is still separated from the solidified filtered yeast layer 32 by a suspension layer which can be measured in mm. Thus returning said excess suspension 30 does not unfavorably affect further separation.

The effect achieved by stripper 25 is especially evident because the suspension 31 which will be dewatered and dried on proceeding to point 14, contains small gas bubbles, is foamy, and contains hop resins. In this case a greater distance of stripper 25 from the surface of filter aid layer 23 can be selected than when dewatering and drying aqueous liquid phase suspensions.

As a result thereof, dewatering and drying of the filtered material 32 is not unfavorably effected by the hop resin globules forming a more or less coherent smeary layer. Removal of the filter cake by scraper blade 26 can readily be carried out without any substantial damage to the underlying filter aid layer 23 so that only a relatively small amount of particles of the filter aid layer will adhere to the lower surface of the filter cake.

The speed of advancement of scraper blade 26 and of stripper 25 which is advanced synchronously therewith may be selected, for instance, with 3 mm. per hour.

EXAMPLE 2

In the cross-sectional view through a rotary filter vertically to its axis of FIG. 2 filter cloth 22 is stretched over the perforated filter drum 21. Filter aid layer 23 is deposited thereon. Said filter aid layer 23 is firmly kept in place by the vacuum in filter drum 21. Filter drum 21 rotates in the direction of the arrow and immerses into the yeast suspension (not shown) in tank 24. Stripper 105 in the form of a knife blade extends over the entire width of the filter aid layer 23. The stripper blade 105 is pivoted about the axis 107 which coincides with the edge of said stripper blade in rack 106 so that it can be locked in any desired position. Said rack 106 can be moved in longitudinal direction and swung around the axis of shaft 118. The stripper blade 105 strips off excess suspension which has been taken up initially by the filter on immersion in tank 24 and causes it to flow back into the tank. The layer of material to be filtered (not shown) which remains on the filter is dewatered and dried by suction and is removed from the filter by scraper 108 which is also constructed in the form of a knife blade. Filter cake scraper 108 is attached to rack 109 which can also be moved in longitudinal direction.

Electromotor 110 with variable speed gearing 111 drives the two sprockets 116 and 117 by means of sprockets 112 and 113 in tandem arrangement, and of sprocket chains 114 and 115 of which the one (114) is crossed. The sprockets 116 and 117 are connected by means of disengaging couplings (not shown) with the shafts 118 and 119. Said shafts 118 and 119 are connected with gears wheels 120 and 121 which, on their part, cause movement of the racks 106 and 109 by which movement stripper 105 and filter cake scraper 108 are brought nearer to filter drum 21. The required distance of stripper 105 from the surface of filter aid layer 23 is determined by disengaging the coupling between chain wheel 116 and shaft 118 and turning shaft 118. The angle between stripper 105 and the surface of the filter aid layer 23 is adjusted by turning the stripper 105 around its axis of rotation 107. By swinging rack 106 around the axis of shaft 118 out of the radius of the filter drum into position 106', the stripper 105 is caused to approach the filter drum 21 more slowly than the filter cake scraper 108. As a result thereof the distance of the stripper from the surface of the filter aid layer 23 is increased during filtration.

Shaft 118 extends over the entire width of the filter. Another rack corresponding to rack 106 and another gear wheel corresponding to gear wheel 120 are also provided at the other end of the stripper 105. They are not illustrated in the cross-sectional view of FIG. 2. This arrangement guarantees that the stripper 105 always remains parallel to filter drum 21 in the direction of its axis. The same applies to scraper 108.

This device operates as follows:

The filter drum 21, the diameter of which, for instance, may be 1,100 mm., is caused to rotate. A vacuum is created in the interior of the filter drum by a vacuum pump. A suspension of the filter aid, for instance, of potato starch is placed in tank 24 so that a filter aid layer 23 of a thickness between about 3 mm. and 30 mm., for instance, of 20 mm. is formed on the filter cloth 22. The filter aid layer 23 may also be provided by conducting the potato starch suspension, for instance, from above upon the filter cloth by means of a distributing pipe (not shown). The filter aid layer 23 which initially has a somewhat irregular surface, is leveled by turning by means of scraper 108 to form a smooth cylinder which is just in contact with the edge of scraper 108. The coupling between sprocket 116 and shaft 118 is disengaged and the shaft 118 is turned manually until the distance of stripper 105 from the surface of the filter aid layer 23 is as desired, for instance, between about 0 mm. and about 10 mm., such as 2 mm. Thereafter, the coupling is forced into engagement. The blade angle of stripper 105 is adjusted, for instance, to 30°. Rack 106 is somewhat swung out of the radius of filter drum 21 in the direction to position 106' while rack 109 points radially to the axis of rotation of the filter drum 21.

The rate of rotation of filter drum 21 is then adjusted to the desired value, namely depending upon the quality of the material to be filtered, between about 0.1 and 100 rotations per minute, for instance, at 15 rotations per minute.

The suspension to be filtered, for instance, Torula yeast cream is filled into tank 24 and its liquid level is kept constant, for instance, by a float valve.

When the filter aid layer 23 immerses into tank 24, it is covered by a layer of the material to be filtered. Excess suspension is stripped off by stripper 105 and returns into tank 24. The material is dewatered and dried by suction in the upper part of filter drum 21. At this point the filtered material may be washed by spraying a washing liquid thereon.

The filter cake scraper 108 peels the vacuum dewatered and dried filter cake off from filter drum 21. The removed filter cake falls into a collecting vessel or, respectively, on a conveying device. Motor 110 is now switched on. It causes advancement of the racks 106 and 109 and simultaneously of stripper 105 and of scraper 108 with a speed between about 0.1 mm. and 20 mm. per hour, for instance, of 1 mm. per hour. The cake scraper 108 now slowly removes by turning a small amount of filter aid from the filter aid layer 23. Due thereto the thickness of the filter aid layer 23 decreases in the course of the filtration and in this example reaches a value near zero after about 20 hours. At that point the rack 109 contacts, for instance, a terminal contact whereby motor 110 is disconnected and a signal sounds which indicates that the filter must be provided with a new filter aid layer.

Stripper 105 follows the receding surface of the filter aid layer 23. Its distance from said layer 23 is, for instance, 2 mm. at the beginning of the filtration and 2.5 mm. at the end of the filtration, i.e., after operation for 20 hours. This increase in distance is made possible because the radial speed components of the advancement of the stripper 105 and the scraper 108 are approximately functions of the cosine of the angle of traverse between 106 and 106'. In contrast thereto, if rack 106 is radially adjusted, i.e., in the direction of the axis of rotation of filter drum 21, the distance of the stripper 105 from the surface of the filter aid layer 23 remains the same during filtration and is in this example 2 mm.

EXAMPLE 3

In the cross-sectional view of a rotary filter shown in FIG. 3 holding device 206 is adjustably mounted on an arcuate guide bar 205. Shaft 208 is attached to an arm 207 pivoted to said holding device 206. Roller 209 serving as stripper is rotatably carried by said shaft 208. A pneumatic cylinder 210 which receives compressed air impulses from the time relay 211 in preselected time intervals, turns the ratchet wheel 213 by means of pawl 212 by one tooth with each impulse. The ratchet wheel 213 is prevented from axial movement by suitable means (not shown) connected to the holding device 206. Ratchet wheel 213 is provided with an inner thread which is engaged on the threaded spindle 214 pivotally attached to arm 207. Stripping roller 209 is brought nearer to filter drum 21 by turning the ratchet wheel 213. Pawl 212 is constructed in such a manner that it releases the ratchet wheel 213 in unstressed condition. As a result thereof manual turning of the ratchet wheel 213 can be effected and thus the distance between stripper 209 and the surface of the filter aid layer 23 can be adjusted. Cake scraper 215 is advanced by means of a drive of similar construction. The pneumatic cylinder 216 also receives, simultaneously with cylinder 210, compressed air impulses from the timing relay 211. This embodiment of the present invention also guarantees that stripper 209 and cake scraper 215 remain parallel to the filter drum 21.

EXAMPLE 4

In the cross-sectional view of still another rotary filter according to FIG. 4 tank 304 which serves as receptacle for the yeast suspension to be filtered, is attached not underneath filter drum 21 but laterally thereto. Tank 304 is open toward the filter layer and is closed at its bottom only by cake scraper 305 constructed in the form of a knife. Such a construction of tank 304 has, among others, the advantage that the entire filtering surface can be utilized more efficiently. Electromotor 306 drives gear wheel 308 by means of variable speed gearing 307 and a coupling (not shown). The gear wheel 308 advances the axially movable rack 309. Cake scraper 305 with tank 304 as well as stripper 311 are connected with rack 309 by means of a support 310. Stripper 311 can be moved by means of adjusting screw 312 so as to adjust its distance from the surface of filter aid layer 23. In this embodiment of the invention there is also taken care that the stripper 311 and the cake scraper 305 remain parallel to the filter drum 21 in the direction of its axis.

According to another embodiment stripper 311 can be fixedly attached to the supporting structure 310 and the scraper 305 can be movably constructed. It is also possible to provide means for adjusting and moving the scraper 305 as well as the stripper 311.

Tank 304 can also be attached to a supporting Lstructure (not shown), which is separate and independent from the support for the scraper 305 and the stripper 311.

The term "stripper" or "stripping means" as used in the specification and the claims designates the device, usually in the form of a knife, which removes excess suspension or material to be filtered from the filter drum after its passage through the tank or vat containing said suspension or material, while the term "scraper" or "scraping means" designates the device, also usually in the form of a knife, by which the dewatered and dried filter cake is removed from the filter.

We claim:

1. In a process of operating a rotary suction drum filter provided on its outer surface with a layer of filter aid, the steps of, forming an overthick layer of wet material to be filtered on said layer of filter aid, removing the excess thickness of said wet layer with stripping means, drying said layer, removing the resulting dried filter cake from said layer of filter aid with scraping means, advancing said scraping means toward said drum, removing surface portions of said filter aid layer as said drum rotates, and advancing said stripping means toward said drum to maintain a selected thickness of said layer of wet material to be filtered on said layer of filter aid as the thickness of said filter aid layer is decreased.

2. The process of claim 1 in which said scraping means and said stripping means are advanced in synchronization.

3. The process of claim 1 in which the advance of said scraping means and said stripping means is continuously progressive.

4. The process of claim 1 in which the advance of said scraping means and said scraping means is intermittently progressive.

5. The process of claim 3 in which the advance of said stripping means is selectively adjustable with respect to the advance of said scraping means.

6. The processof claim 4 in which the advance of said stripping means is electively adjustable with respect to the advance of said scraping means.

7. The process of claim 1 in which the thickness of said filter aid layer is from about 3 mm. to about 30 mm. and is reduced at the rate of about 0.1 mm./hour to about 20 mm./hour by said scraping means.

8. The process of claim 1 in which the advance of said stripping means is adjusted to cause an increase in the thickness of said filter cake.

9. In a rotary suction drum filter provided with a layer of filter aid on its outer surface, stripping means for removing the excess of an overthick layer of wet material to be filtered as it forms on said drum, scraping means for removing the dried filter cake from said filter aid layer, positive means for advancing said scraping means toward said drum to also remove surface portions of said filter aid layer as said drum rotates, and positive means for initially positioning and for advancing said stripping means toward said drum to maintain a selected thickness of said wet layer of material to be filtered on said layer of filter aid as the thickness of said filter aid layer is decreased.

10. The filter of claim 9 in which means are provided for advancing said scraping means and said stripping means in synchronization.

11. The filter of claim 9 in which means are provided for continuously advancing said scraping means and said stripping means.

12. The filter of claim 9 in which means are provided for intermittently advancing said scraping means and said stripping means.

13. The filter of claim 9 in which the means for advancing said stripping means is selectively adjustable with respect to the means for advancing said scraping means.

14. The filter of claim 9 in which the thickness of said filter aid layer is from about 3 mm. to about 30 mm. and in which said scraping means is advanced to reduce the thickness thereof at the rate of about 0.1 mm./hour to about 20 mm./hour, with a corresponding rate of advance of said stripping means.

15. The filter of claim 9 provided with a common support for said scraping and said stripping means.

16. The filter of claim 9 in which the scraping means for removing the filtered material from the filter and the stripping means and the tank for the material to be filtered are provided on a common support.

PO-1050
(5/69)

UNITED STATES PATENT OFFICE
CERTIFICATE OF CORRECTION

Patent No. 3,616,908        Dated November 2, 1971

Inventor(s) KARL ROKITANSKY ET AL.

It is certified that error appears in the above-identified patent and that said Letters Patent are hereby corrected as shown below:

Column 3, line 12: "filtered", second occurrence, should be cancelled; line 13: "material" should be cancelled; line 16: "form" should read -- from --; line 58 (60?): "by step", second occurrence, should be cancelled; column 8, line 40 (42?): "scraping", second occurrence, should read -- stripping --; line 45 (47?) "processof" should read -- process of --.

Signed and sealed this 9th day of May 1972.

(SEAL)
Attest:

EDWARD M. FLETCHER, JR.           ROBERT GOTTSCHALK
Attesting Officer                 Commissioner of Patents